Nov. 15, 1966  R. G. HILL ET AL  3,285,137

TRACER HEAD

Filed June 11, 1965  7 Sheets-Sheet 1

INVENTORS
ROGER GETTYS HILL
GEORGE A. HOFFMAN

BY *Darley & Darley*

ATTORNEYS

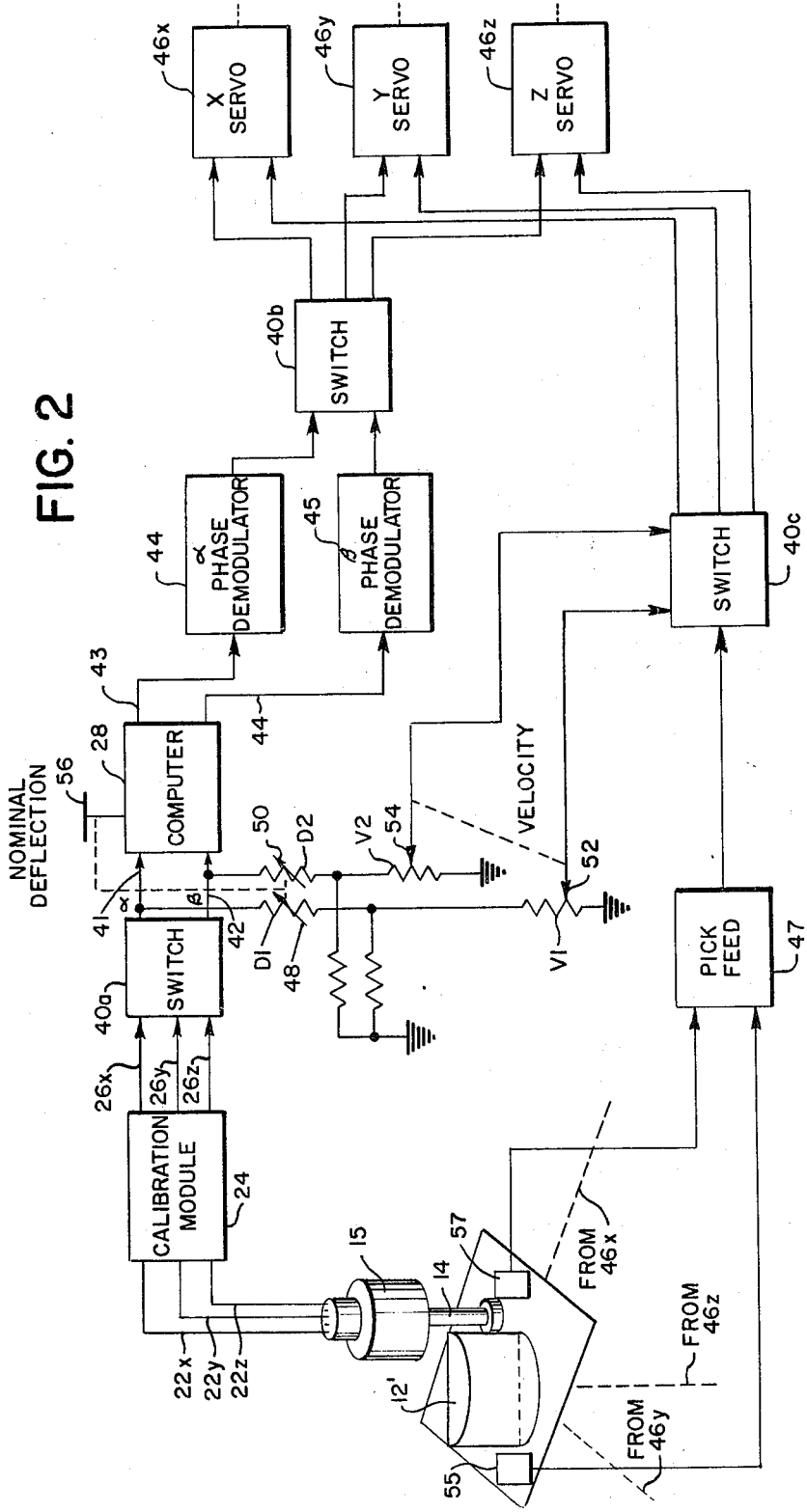

FIG. 3B

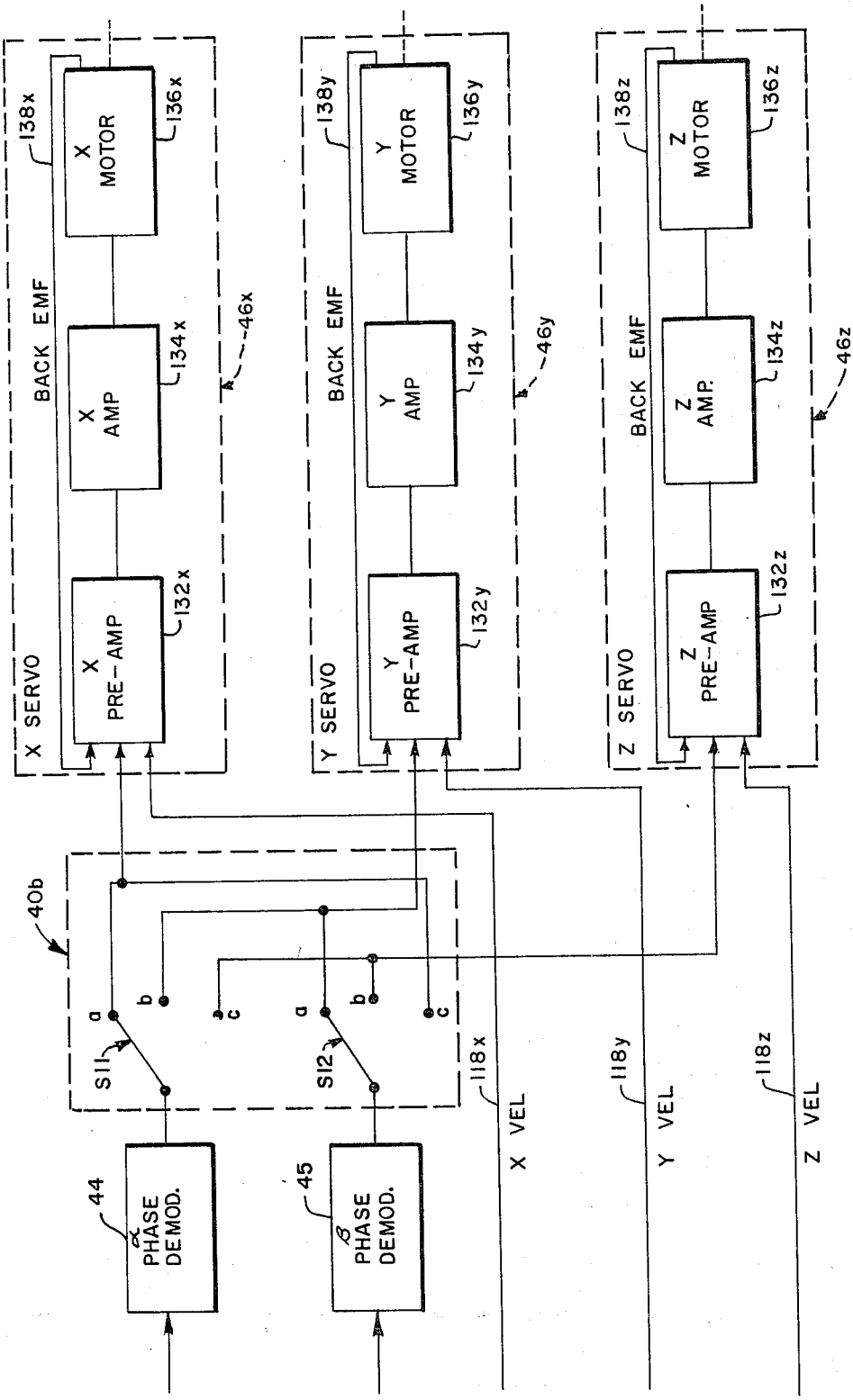

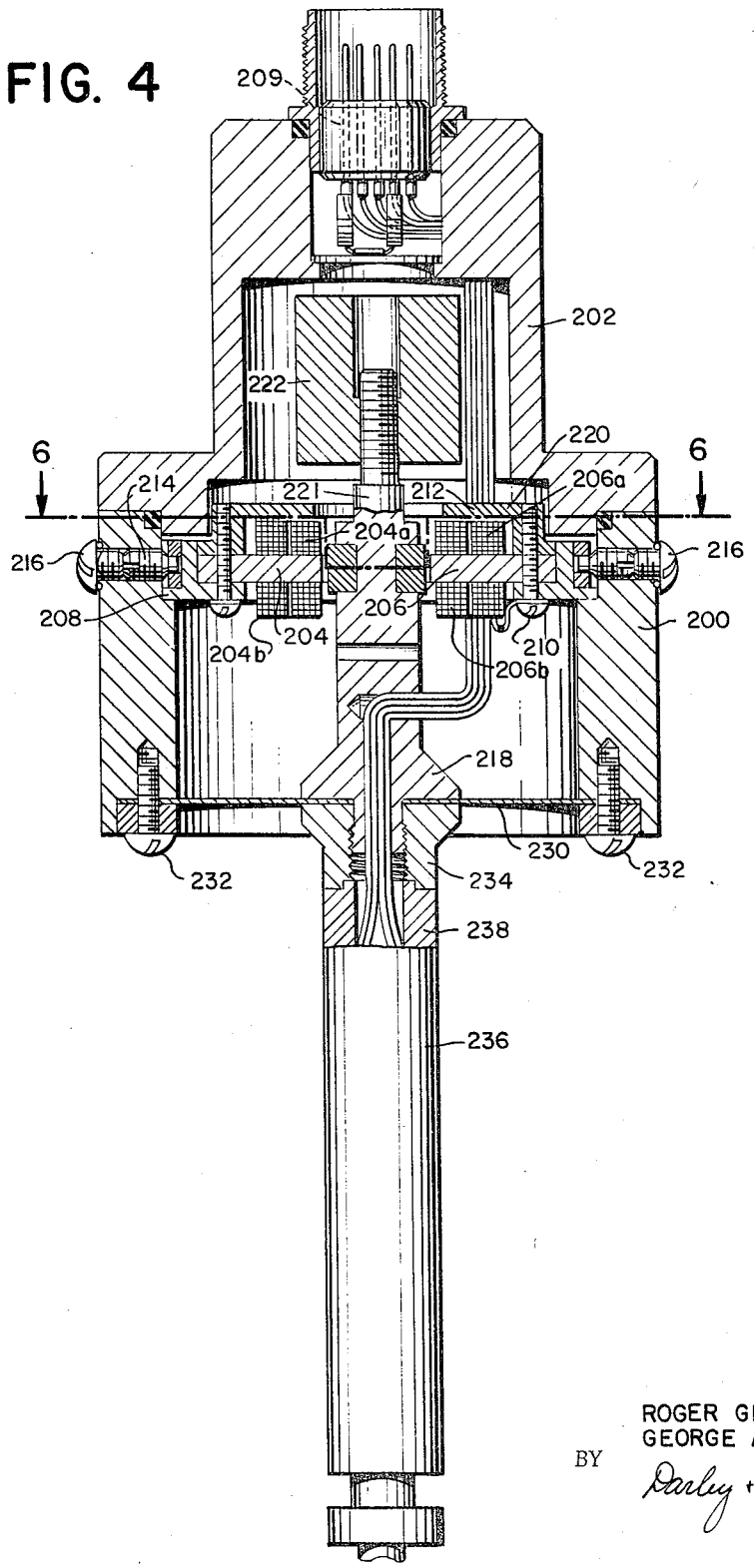

Nov. 15, 1966

R. G. HILL ET AL 3,285,137

TRACER HEAD

Filed June 11, 1965

INVENTORS
ROGER GETTYS HILL
GEORGE A. HOFFMAN

BY *Darley & Darley*

ATTORNEYS

United States Patent Office 3,285,137
Patented Nov. 15, 1966

3,285,137
TRACER HEAD
Roger Gettys Hill, 5000 Windpoint Drive, and George A. Hoffman, 2606 Westwood Drive, both of Racine, Wis.
Filed June 11, 1965, Ser. No. 463,280
7 Claims. (Cl. 90—62)

This invention relates to machine tools, and, in particular, to a tracer head for use with automatic machine tools.

Fundamentally, two different techniques are used to automatically control the operation of machine tools such as milling machines, saws, and the like. One involves digital techniques whereby a programmed tape or the like is used to position the tool. The second, and older of the two, is a tracing operation wherein movement of a tracing stylus with respect to a template provides electrical control signals which are used to position the work piece with respect to the tool. Each system has certain advantages and the present invention relates to a tracer system which, in general, is less expensive and less complex than a digital system, and provides a superior finish in the case of a milling head or the like, since, necessarily, machine movement in a digital system is incremental.

In the tracer art a number of different techniques have evolved. In a basic single axis tracing system the template is moved with respect to the tracer head along a feed axis at a constant rate of speed. The error signal produced by deflection of the tracer stylus is used to position the template with respect to the stylus (and thus the work piece with respect to the tool) along a tracer axis transverse to the feed axis. The major disadvantage of a single axis tracing system is that the constant movement along the feed axis requires the generation of an infinite error signal to trace a path parallel to the tracer axis. Furthermore, the relative velocity between the template and tracer stylus is a function of the error signal, and a change in velocity is detrimental to the finish of the work piece.

A modification of the single axis tracing system, known as single axis with slow down or 180° tracing, includes a provision for automatically slowing or stopping movement along the feed axis depending upon the generated error signal. In a known fashion, this enables the machine to trace a path parallel to the tracer axis while reducing the error inherent in the system. As its name implies, any 180 degree tracing system is only capable of tracing a maximum excursion of 180 degrees because of the inability of the device to reverse movement along the feed axis.

The latter drawback has been overcome by the development of 360 degree systems which controls movement of the template with respect to the tracer stylus along both the feed and tracer axes thereby permitting tracing of a continuous path. In addition, because a 360 degree system provides control along both axes, such systems need include no inherent position error and, in theory, can trace at a constant velocity with respect to the template. The latter feature is important since it provides an improved finish on the completed work piece. The former provides the known advantages of servos operating around their nulls.

The most advanced forms of 360 degree tracing systems utilize tracer heads which produce output voltages proportional in amplitude to the stylus deflection along the feed and tracer axes, which for the present purposes, may be considered the Y and X axes. The Y and X deflection voltages are in phase and one of the two is shifted ninety degrees and then combined with the other to form an alternating voltage having an amplitude proportional to the magnitude of stylus deflection and a phase proportional to the direction in which such deflection occurs.

The deflection of the stylus will always be perpendicular to the template, and since it is desired to move the stylus tangentially with respect to the template surface, the velocity vector must always be perpendicular to the direction of deflection. Thus, once the phase of the nominal deflection is known, the direction of a velocity signal may be calculated by shifting the nominal deflection signal ninety degrees. The required amplitude of the velocity signal may be achieved by increasing the level of the voltage signal by a selected amount.

Ideally, the position error is minimum; therefore it is necessary to also position the template with respect to the stylus so that the stylus deflection returns to its nominal value. This requires relative movement between the stylus and template opposite that of the deflection error signal, and hence the necessary control signal for this purpose is derived by reversing the phase of the position error voltage. In the prior art, the position error and velocity signals are combined to produce a resultant voltage having an amplitude and phase proportional to the magnitude and direction in which relative movement must occur. By phase demodulating this resultant voltage the necessary X and Y servo control voltages are derived whereby the template is positioned with respect to the stylus so that the position error returns to zero while the velocity vector remains constant in the direction tangential to the template.

In theory, the prior art devices described above provide the desired result. However, since the velocity signal is much greater than the position error (which desirably is zero), the control circuits in one of the channels must sometimes reject these large signals while responding to the low amplitude position error signals. In practice this difficult, and the failure of prior art devices to suitably reject the undesired velocity voltages has resulted in decreased accuracy.

An object of the present invention is to provide a tracer head for use in a tracing system wherein the position error is substantially zero and wherein the nominal deflection of the stylus is extremely low and variable over a relatively wide range.

Another object of the invention is to provide a tracer head capable of providing signals proportional to the stylus deflection along three mutually perpendicular axes.

According to the invention a three dimensional head is provided which is capable of producing alternating signals which vary in amplitude as functions of stylus deflection along each axis. In accordance with this feature of the invention, the vertical or Z axis transducer comprises a unique spring mounted stylus holder which biases a magnetic core to a neutral position within a vertical transducer coil, and which may be readily combined with the structure of a conventional two dimensional tracing head so that all three required transducer signals can be derived from a single head.

The manner in which the above and other objects of the invention are accomplished is described more fully below with reference to the attached drawings, wherein:

FIGURE 2 is a block diagram of a fully automatic three dimensional tracing system also incorporating the principles of FIGURE 1;

Figure 3A:
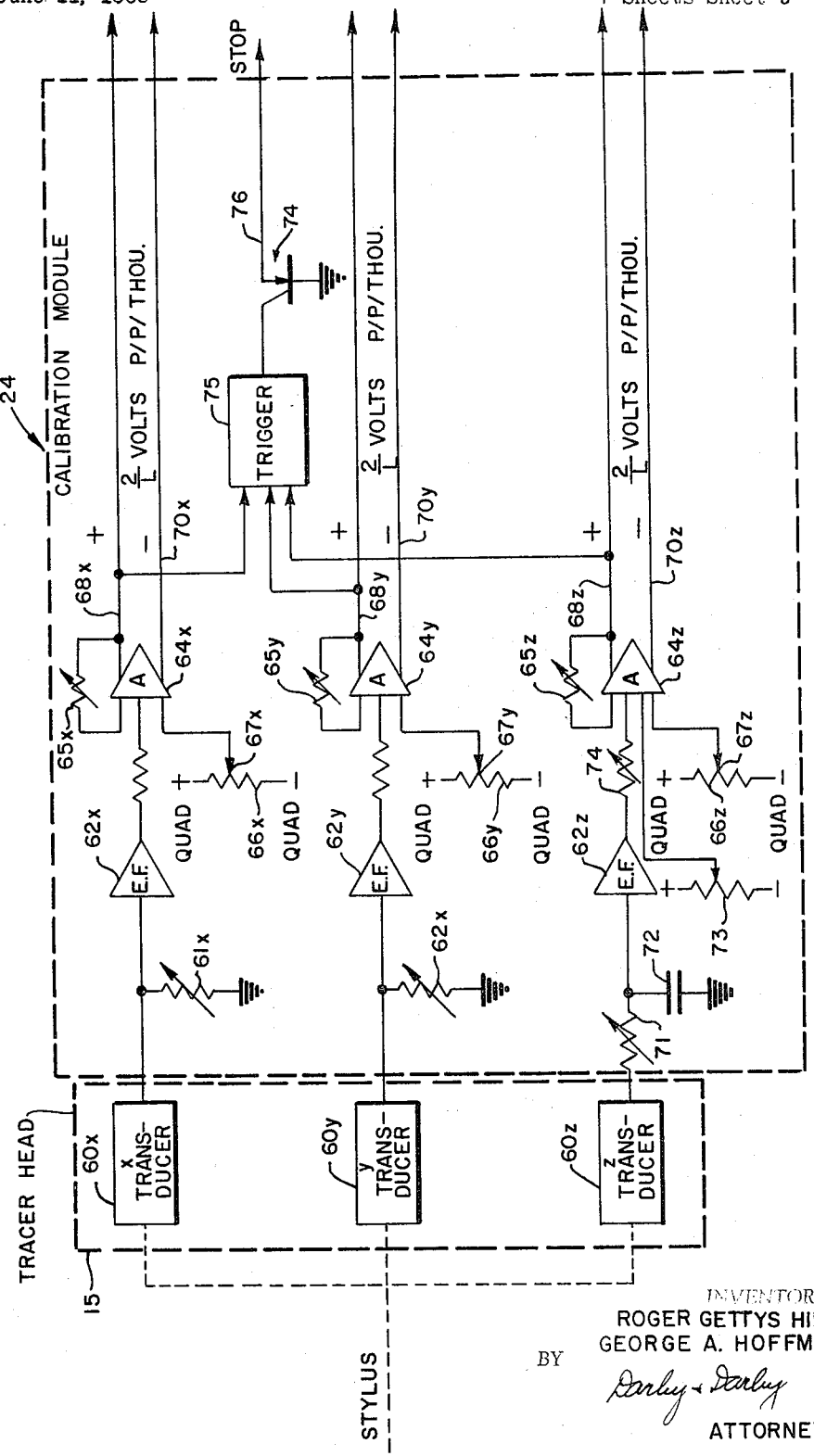
Figure 3B:
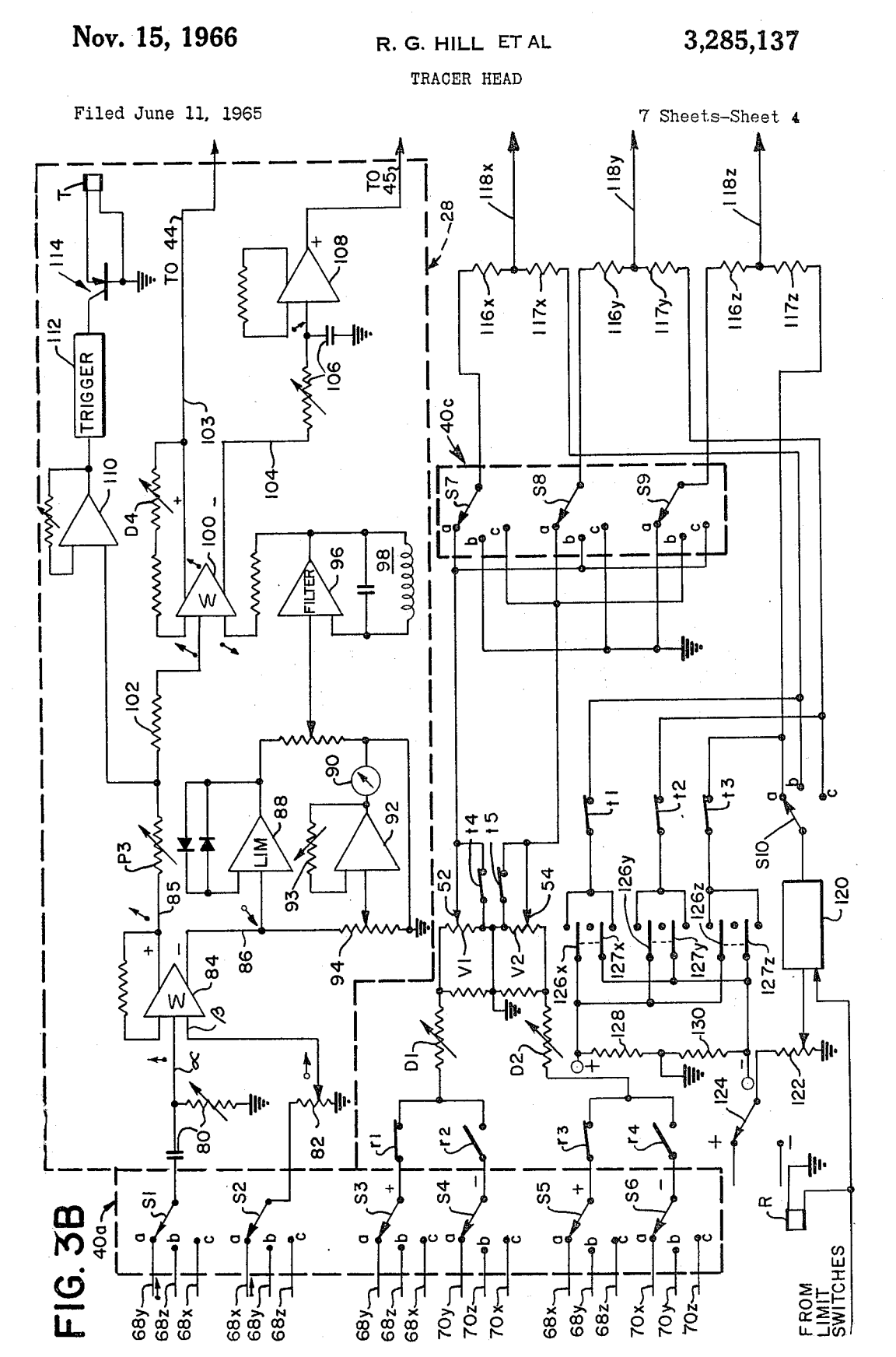
Figure 5:
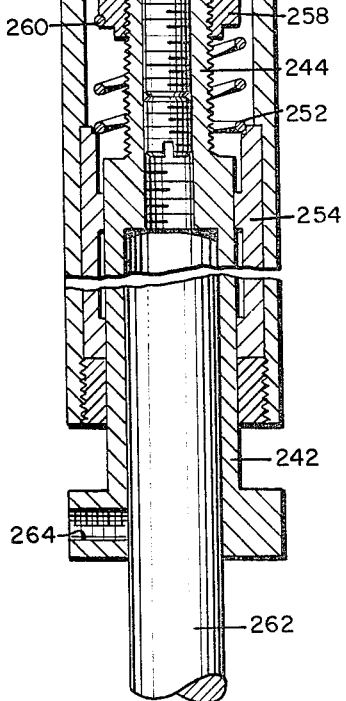
Figure 6:
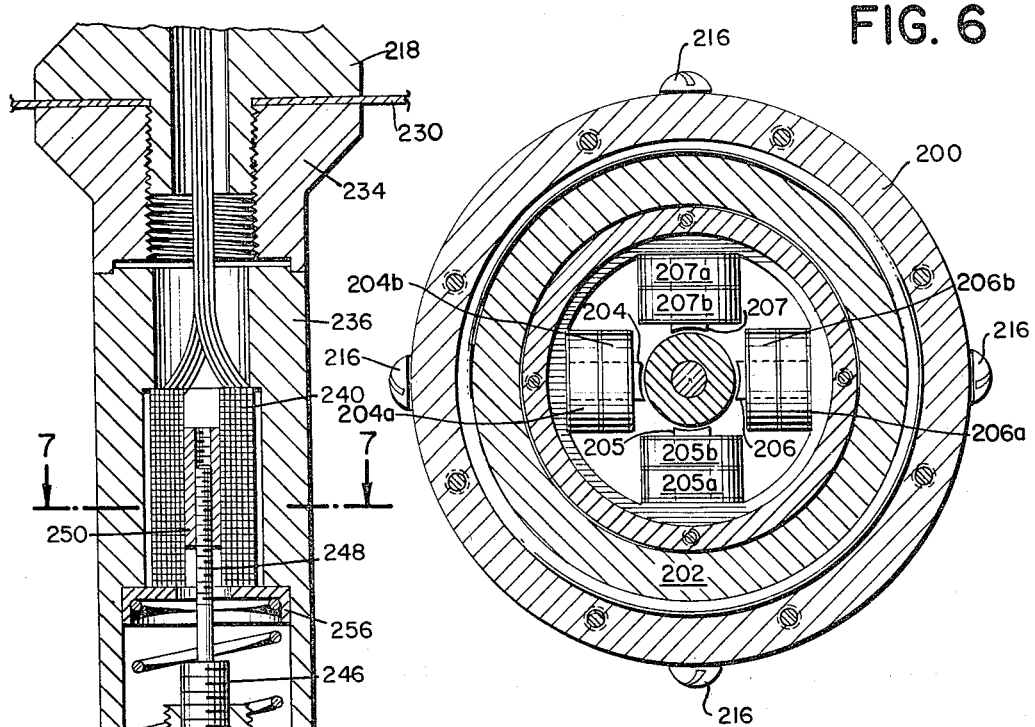

FIGURES 3A, 3B, and 3C comprise a circuit diagram in partial schematic form of the three dimensional system of FIGURE 2;

FIGURE 4 is a side view partially in section of a three dimensional tracing head according to the invention;

FIGURE 5 is a side sectional view showing the details of the novel Z axis transducer means of the tracing head of FIGURE 2;

FIGURE 6 is a cross sectional view along the line 6—6 of FIGURE 4; and

Figure 7:
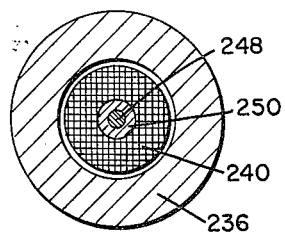

FIGURE 7 is a cross sectional view along the line 7—7 of FIGURE 5.

Figure 1B:
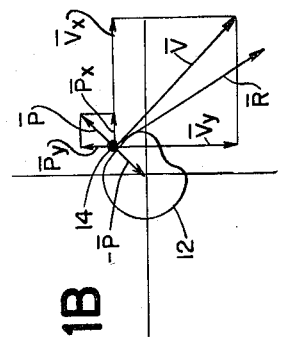
FIGURE 1B is a vector diagram used for explanatory purposes.
Figure 1A:
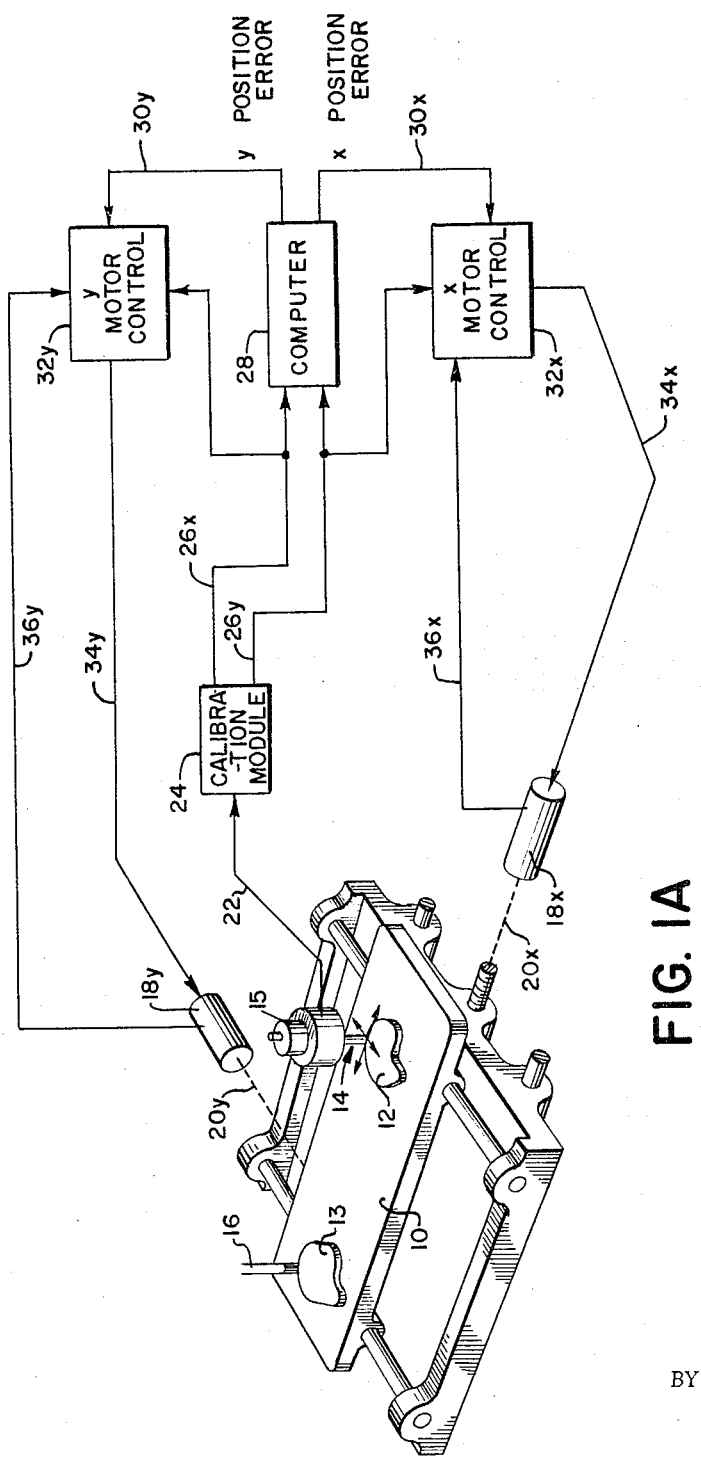
FIGURE 1A is a block diagram showing the application of certain principles of the invention to a two dimensional tracing system.

Referring to FIGURE 1A, the principles of the invention are illustrated in block diagram form as applied to a two dimensional tracing system. A machine table is shown schematically at 10 with a master or template 12 and the work piece 13 situated thereon. A tracer stylus 14 mounted in a head 15 cooperates with template 12 and produces the control signals which cause tool 16 to operate on workpiece 13 to form a product identical to template 12.

Relative movement between tracer stylus 14 and template 12 is provided by reversible motors 18x and 18y which, through schematically illustrated lead screws 20x and 20y, position the table 10 along X and Y axes. In the following specification the letters $x$ and $y$ are used to designate components which are associated with the respective axes.

The present invention relates to the apparatus for positioning the workpiece with respect to the tool and is not dependent in any way upon the actual machine tool used. For this reason, the machine tool, motors, lead screws, etc., are illustrated only in schematic form. Moreover, it will be apparent that even the schematically illustrated construction is not necessary to practice the invention. For example, table 10 could be moved along one axis and the stylus 14 and cutting tool 16 along the second axis, or, the stylus and tool alone could be moved along both axes. The invention would have equal utility with a system in which the table is rotated with respect to the stylus and linear motion occurs radially of the table, i.e., polar coordinate tracing. The only requisite is that relative movement between stylus 14 and template 12 control the relative movement between workpiece 13 and tool 16. Conventionally, the tool and tracer head 15 are stationary with respect to earth.

The tracer head 15 produces output signals on cable 22 which are representative of the deflection of the stylus 14 along both the Y and X axes. These signals are fed through a calibration module 24 to appear on lines 26x and 26y. The voltages on lines 26x and 26y are alternating voltages which are in phase, the respective magnitude being proportional to the deflection of the stylus by the template along the associated axes.

These signals are then fed to a computer 28 which, as explained below, produces on line 30y a direct voltage (for example) proportional to the position error of stylus 14 with respect to the Y axis, and a direct voltage on line 30x proportional to the position error of stylus 14 along the X axis. Lines 30x and 30y are fed as one input to respective motor control units 32x and 32y.

In the prior art, as explained above, a resultant vector was derived by the computer and the Y and X components thereof subsequently used to control the respective motors. In the present case, the computer 28 calculates the position error along the Y and X axes while the velocity control signals are derived directly from the calibration module 24. As illustrated, the X error signal on line 26x provides the velocity input to the Y motor control unit 32y and the Y position error on line 26y provides the velocity input to the X motor control unit 32x.

The motor control units 32x and 32y operate the reflective motors 18x and 18y via lines 34x and 34y with feedback lines 36x and 36y providing the required references for operating the motors.

The theory of operation is further explained with reference to the vector diagram of FIGURE 1B. In FIGURE 1B the Y and X axes are as illustrated with the template 12 and stylus 14 shown in a representative position. The deflection of the stylus 14 is shown by a vector $\overline{P}$ which extends in a direction normal to the template surface contacting stylus 14. It is desired that the velocity of stylus 14 with respect to template 10 be tangential to the template surface at a constant magnitude as shown by $\overline{V}$. It is further desirable, for reasons well known in the servo arts, to operate around the null points of the servos, which requires reduction of $\overline{P}$ to zero. It is therefore necessary that the servos position stylus 14 with respect to template 12 as shown by the vector $-\overline{P}$.

Before proceeding further with the explanation, it should be noted that the present discussion is for explanatory purposes only and is not intended in any respect to indicate the voltages which will actually exist in the system. In many respects the present discussion is oversimplified, but should aid in an understanding of the present invention.

Both the prior art and the invention move the stylus with respect to the template in accordance with the information contained in the voltages represented by $\overline{V}$ and $-\overline{P}$. The prior art computed the required control voltages for the X and Y servos by combining $\overline{V}$ and $-\overline{P}$ into a resultant vector $\overline{R}$. The resultant X and Y components of $\overline{R}$ (not shown) were derived from a phase detecting device and these component voltages used to drive the servos. As noted above, such prior art devices experienced considerable difficulty in deriving the required control signals because of the actual disparity in amplitude between voltages $\overline{V}$ and $-\overline{P}$.

The present invention avoids these difficulties, in effect, by using the component voltages of the nominal deflection as they come directly from the tracing head to derive the velocity control. Thus, the required velocity vector $\overline{V}$ may be thought of as being composed of two vectors, $\overline{V}x$ and $\overline{V}y$. If the magnitude of $\overline{V}x$ is proportional to the magnitude of $\overline{P}y$, and the magnitude of $\overline{V}y$ is proportional to the magnitude of $\overline{P}x$, it is clear that $\overline{V}$ will be precisely perpendicular to $\overline{P}$. If the magnitude of $\overline{P}$ remains constant, the magnitude of $\overline{V}$ will remain constant. Therefore, by taking a voltage proportional to $\overline{P}x$, and applying it to 32y, and a voltage proportional to $\overline{P}y$ and applying it to 32x, a template velocity is created which is constant in magnitude and tangent to that portion of the template surface in contact with the stylus. Simultaneously, the Y position error and X position error signals (should there be any) on lines 30y and 30x, respectively, produce the required null producing signal to position the stylus so that the position error voltage tends to zero.

FIGURE 2 is a block diagram showing the application of the above and other novel principles to a three dimensional tracing system. Wherever possible the identifying numerals of FIGURE 1A are used to designate the identical component in FIGURE 2. The three axes are designated as X, Y, and Z axes, and those elements of the system which operate along only one of the axes are designated by the use of a corresponding lower case $x$, $y$, or $z$ adjacent the identifying numeral. It is again assumed that the tool and tracer head remain stationary with respect to earth, the table supporting the workpiece and template being movable along all three axes.

The outputs of the head 15 are coupled via lines 22x, 22y, and 22z to the calibration module 24. Each of the inputs to module 24 is an alternating voltage having an amplitude proportional to the deflection of the stylus with respect to a three dimensional master 12' along the associated axis. The calibration module 24, as explained in detail below, removes certain undesirable voltages from each of the control signals and these three signals are then fed to a routing switch 40a.

In the preferred embodiment of the invention, the three dimensional tracing is accomplished by tracing along two axes (hereinafter the $\alpha$ and $\beta$ axes) in the manner explained with reference to FIGURE 1A, stepping the stylus with respect to the template along the other axis (hereinafter the pick feed axis) after each tracing operation, and then retracing along the $\alpha$ and $\beta$ axes in the reverse direction. In this fashion, the tracing stylus scans back and forth over the three dimensional master 12' until the entire volume has been covered. The operator can manually select any two axes for the two dimensional tracing with the third axis automatically being used as the pick feed axis. For this purpose three switches 40a, 40b, and 40c are schematically illustrated in FIGURE 2, with the contacts of the three switches being simultaneously operated to appropriately route the respective control signals.

Switch 40a has two outputs 41 and 42 which are coupled to a computer 28 and on which appear the voltages corresponding to the stylus deflection along the selected $\alpha$ and $\beta$ axes. In other words, if it were desired to trace along the X, Y axes the signals on line 41 and 42 would correspond to the control voltages on line 26x and 26y, respectively. The voltages on lines 41 and 42 are vectorially combined by computer 28 which produces on output lines 43 and 44 respective voltages having amplitudes and phases representative of the component of stylus deflection along the $\alpha$ and $\beta$ tracer axes. Lines 43 and 44 are coupled to respective $\alpha$ and $\beta$ phase demodulators 44 and 45, the outputs of which are representative of the position errors along the selected $\alpha$ and $\beta$ axes. In accordance with well known principles, such outputs may be direct voltages which are then coupled to the X and Y servos 46x and 46y, respectively, through switch 40b. Switch 40b serves to retranslate the selected $\alpha$ and $\beta$ axes into the requisite X, Y, and Z coordinates. Hence, with $\alpha$ and $\beta$ corresponding to the X and Y axes, respectively, the outputs of phase demodulators 44 and 45 are coupled to servos 46x and 46y, respectively.

The velocity signals are derived directly from the output of switch 40a through deflection pots D1, D2 and velocity pots V1, V2. The slide wires 52 and 54 of the velocity pots are also coupled through switch 40c to the proper servos so that the $\alpha$ velocity signal drives the servo controlled by the $\beta$ position error and vice versa. Switch 40c also routes appropriately timed signals from a pick feed generator 47 to the third servo to provide the three dimensional tracing.

By way of example, if it is desired to trace in the X, Y plane, (i.e., $\alpha$ and $\beta$ correspond to the X and Y axes), switches 40a, 40b, and 40c operate so that the pick feed generator 47 is coupled to servo 46z; the X position error is coupled to servo 46y and the Y position error is coupled to servo 46x to provide the required velocity signals. The position error control for the servos 46x and 46y are derived from the $\alpha$ and $\beta$ phase demodulators 44 and 45, respectively. When a tracing operation has been completed in one plane, limit switches 55 or 57, suitably positioned, are actuated causing the pick feed 47 to step the stylus along the pick feed axis and reinitiating the tracing operation in the $\alpha$ and $\beta$ axes but in the reverse direction. This control is explained in greater detail below.

To this point, the explanation, has proceeded under the theoretical assumption that for a zero position error there is no stylus deflection. In reality, and as is well known, it is necessary that there be some initial or nominal deflection of the stylus with respect to the template to initiate the circuit operation. This nominal deflection is an important parameter and, for reasons well known in the art, is desirably low and variable over a relatively wide range. The present invention includes means (not shown in FIGURE 2) for indicating the stylus deflection and controls on the panel permitting the operator to vary the deflection over a wide range. Such adjusting means are shown schematically at 56 which sets the computer 28 depending upon the desired nominal deflection.

When system operation is to be initiated, the template 12' is manually slewed with respect to the stylus 14. As the stylus 14 is deflected, voltages appear along the selected $\alpha$ and $\beta$ tracer axes which are coupled to lines 41 and 42. When these voltages reach a pre-determined level which is dependent upon the selected nominal deflection, the system operation commences as described above.

Because the velocity inputs to the selected servos 46x, 46y and 46z are derived directly from the $\alpha$ and $\beta$ lines 41 and 42, it is necessary that the voltages on lines 41 and 42 be increased or attenuated in accordance with the nominal deflection selected. If this were not the case, a change in nominal deflection would also cause a change in velocity, which is undesirable. Hence, for this purpose the adjusting means 56 is mechanically linked to the slide wires 48 and 50 of deflection pots D1 and D2, respectively. These pots are appropriately calibrated so that when the nominal deflection of the system is increased the voltage across the velocity pots V1 and V2 remain substantially constant despite the increased voltage on lines 41 and 42.

To change the magnitude of the velocity vector, it is merely necessary to vary the position of slide wires 52 and 54, which are mechanically coupled together, thereby varying the level of the voltage coupled to the respective servos 46x, 46y, and 46z.

FIGURES 3A, 3B and 3C comprise a detailed block diagram, partially in schematic form, of the embodiment of the invention illustrated in FIGURE 2. Where possible, the same numerals are used to identify those elements which are not changed, with the "blocks" of FIGURE 2 defined by dotted lines.

FIGURE 3A illustrates the calibration module shown at 24 in FIGURE 2. The purpose of the calibration module is to remove quadrature voltages appearing in the transducer outputs from head 15 due to the distributed capacitance of the respective transducer coils, which are illustrated in FIGURES 4-7. Since the invention requires a shift in phase of one of the transducer output voltages by ninety degrees, and subsequent combination thereof with a reference phase, the appearance of such quadrature voltages will introduce errors into subsequent points of the circuit unless they are removed.

In FIGURE 3A, X, Y, and Z transducers 60x, 60y and 60z, respectively, are schematically illustrated as mechanically coupled to the stylus 14. The output of each of the transducers is an alternating voltage having an amplitude proportional to the stylus deflection along the corresponding axis. In theory, all three transducer outputs are in phase, but, as mentioned above, in practice there will be a slight amount of quadrature voltage in each instance. By way of example, the frequency of the transducer voltage may be 1000 c.p.s.

Since the calibration module circuits in each of the three channels are substantially identical, the operation of the X channel alone is described, it being understood that the identically numbered elements in the Y and Z channels operate in the same fashion. The special elements of the Z channel are specifically described.

There are a number of places in the drawings in which positive and negative signs appear although the circuit employs alternating voltages. These signs are used to indicate phase, a plus sign being indicative of the phase of an arbitrary reference voltage and the negative sign indicative of a voltage at the same frequency displaced one hundred eighty degrees in phase. Ideally, the outputs of the transducers 60x, 60y and 60z should be in phase with the reference.

The alternating voltage on the output of transducer 60x is taken across a variable resistor 61x and fed through an emitter follower 62x to a summing amplifier 64x. Amplifier 64x includes a variable feedback resistor 65x and a quadrature voltage divider 66x across which appears an alternating voltage at the same frequency as the output of transducer 60x but displaced in phase by ninety degrees.

The purpose of the voltage divider 66x is to cancel any quadrature voltage appearing on the output line of transducer 60x. Thus, at the time of manufacture, the slide-wire 67x is adjusted so that when the output of the emitter follower 62x is summed with the quadrature voltage across voltage divider 66x, the undesired quadrature voltage is completely cancelled. The variable resistor 61x is similarly adjusted to insure that the output of transducer 60x is exactly in phase with the selected reference. In practice, there is some slight phase deviation in the transducer output from the reference which can be accounted for by a change in resistance value of the circuit.

The feedback resistor 65x sets the amplitude of the output voltage appearing on line 68x and 70x at a particular level for a given deflection. By way of example, the magnitude of the output voltage appearing on lines 68x and 70x may be made equal to 2/L volts peak-to-peak per thousandth of an inch stylus deflection along the X axis, where L is equal to the length of the stylus. With the voltage divider 66x and resistor 61x properly set, the output will be exactly in phase with the one thousand cycle reference and include no quadrature components.

The principle of operation of the Z channel is substantially the same as that described above, but there are slight differences since the transducer 60z (in the preferred embodiment) operates in a different manner from that of transducers 60x and 60y. For this reason, a variable resistor 71 is placed in series with the emitter follower 62z and a capacitor 72 connected across the input to the ground. The circuit, however, accomplishes the same function in that adjustment of resistor 71 is used to ensure that the input to the emitter follower 62z is precisely in phase with the thousand cycle reference.

The quadrature voltage is removed in the same fashion as described above, but a second voltage divider 73 is used to provide a Z axis null. This is necessary since, as explained below, the force of gravity has an effect on the Z axis transducer and when a particular stylus is inserted into the tracing head, it is necessary to adjust voltage divider 73 so that the output of amplifier 64z is zero when the stylus is not deflected by the template. The Z axis null potentiometer 73 is located on the front of the control panel to facilitate adjustment during actual use.

A variable resistor 74, also accessible from the front of the control panel, is used to accommodate different length styli. Resistor 74 changes the gain of amplifier 64z so that the output on lines 68z and 70z remains equal to 2/L volts peak-to-peak per thousandths of an inch deflection regardless of the stylus length. As will become more apparent below, the outputs of the transducers 60x and 60y are directly related to the length of the stylus L, while the output of transducer 60z is independent of stylus length. Hence, by increasing the value of resistance 74 for increased stylus length, the voltage output from transducer 60z can be maintained in the same proportion as the outputs of transducer 60x and 60y.

As a safety feature, a trigger circuit 75 has inputs coupled to lines 68x, 68y and 68z so that when the sum of the signals on these three lines exceeds a predetermined magnitude, an output pulse fires a silicon controlled rectifier 74 to produce a voltage on line 76 which, in an obvious manner, can be used to halt operation of the system.

To provide the switching operations schematically illustrated by switches 40a, 40b and 40c in FIGURE 2, a switch consisting of twelve rotary armatures ganged together on a single shaft is provided with each armature cooperating with one of three stationary terminals. In the interest of simplicity the mechanical inter-connections of the respective armatures are not shown in FIGURES 3B and 3C. Each armature of the switch is identified by the letter "S" followed by a distinguishing numeral with the stationary contacts in each case identified by a, b and c. Each of the armatures S1 to S12 contacts the identically lettered stationary terminal at the same time.

In the illustrated condition the contacts S1 to S12 are contacting the upper or "a" terminal which selects the XY axes as the tracing axes and the Z axis as the pick feed axis. The lines entering FIGURE 3B from the left correspond to the identically numbered lines of FIGURE 3A with the phase relationship the same as that explained above.

In its illustrated condition, the thousand cycle transducer voltage on line 68y is coupled through armature S1 and a ninety degree phase delay RC network 80 to one input of a summing amplifier 84. The other input to amplifier 84 is derived from line 68x via armature S2 and a voltage divider 82.

The effect of the ninety degree phase delay network 80 is to shift the $\alpha$ transducer signal from 60y so that its phase corresponds to the direction of deflection along the $\alpha$ axis (assuming the phase reference to be along the $\beta$ aixs). Hence, at the input to amplifier 84 there are two voltages having respective amplitudes and phases corresponding to the magnitude and direction of the stylus deflection along the selected $\alpha$ and $\beta$ axes. To aid in the explanation, vector representations of the voltages appearing at different points in the computer 28 are illustrated. These vectors do not represent voltages which would normally appear in practice, but taken with the following description may facilitate an understanding of the device.

When the two inputs to amplifier 84 are summed, the resultant voltage has an amplitude proportional to the stylus deflection in the $\alpha$, $\beta$ (here Y, X) plane and a phase corresponding to the direction in which such deflection occurs. This deflection voltage appears on line 85, with a voltage one hundred eighty degrees out of phase with the deflection voltage and equal in amplitude appearing on line 86. The voltage on line 86 is fed through a conventional limiter 88 which limits the alternating voltage at its input to set the nominal deflection as explained more fully below. The voltage on line 86 is also coupled to a deflection meter 90 through amplifier 92 and voltage divider 94. An adjustable feedback resistor 93 is used to calibrate deflection meter 90. Hence, the meter by measuring the voltage level appearing on line 86 provides a visual indication to the operator of the extent to which the stylus has been deflected. The meter may be calibrated in units representing thousandths of an inch deflection.

The limiter 88 determines the nominal deflection, which must always be present, and its output will approximate a square wave because of the limiting action. Hence, the limiter voltage is coupled through a filter circuit 96 including an LC circuit 98 tuned to the reference frequency of one thousand cps. so that the output of amplifier 96 is again a perfect sine wave.

A summing amplifier 100 combines the outputs of filter 96 and the deflection voltage appearing on line 85, the latter having been attenuated by a third deflection pot D3 and a current limiting resistor 102. A fourth deflection pot D4 is in the feedback circuit of summing amplifier 100. Deflection pots D3 and D4 are ganged with the deflection pots D1 and D2 described above with reference to FIGURE 2. Pot D3 produces the actual change in nominal deflection while pots D1, D2, and D4 compensate for changes in the nominal deflection where the appearance of this change would be detrimental.

Since the output of filter 96 and the voltage on line 85 are one hundred eighty degrees out of phase, the summing amplifier 100 subtracts the nominal deflection, determined by limiter 88, from the actual deflection appearing on line 85. Since it is the extent to which the actual deflection exceeds the nominal deflection that controls the circuit operation, the critical intelligence appears on line 103 and 104 having the phase relationship illustrated.

The outputs of the transducers 60x, 60y and 60z are independent of the selected nominal deflection. If it is desired to change the nominal deflection (for tracing purposes) it is necessary to appropriately control the inputs to summing amplifier 100 so that its output remains representative of the actual error signal. Thus, pots D3 and D4 are used to "dial in" the desired deflection by suitably controlling the input voltages coupled to amplifier 100. For example, if the nominal deflection is increased from .002 inch to .004 inch, the resistance values of pots D3 and D4 are suitably increased so that when the actual stylus deflection reaches .004 inch (which would produce a relatively large error signal for a .002 inch nominal deflection) the output of amplifier 100 is zero.

The voltage on line 103 is fed to the α phase demodulator 44 which produces a direct voltage proportional to the actual error along the Y axis as represented on the output of summing amplifier 100. The phase of the signal on line 104 is advance ninety degrees by RC network 106, and then amplified by amplifier 108 so that the magnitude of the signal coupled to the β phase demodulator 45 is equal to the magnitude of the signal appearing on line 103. Hence, the output of the β phase demodulator 45, in the present example, will be a direct voltage equal to the position error of the stylus with respect to the Y axis.

The circuit operation is initiated when the total actual deflection exceeds a predetermined magnitude. For this purpose, the voltage at the junction of pot D3 and resistor 102 is coupled through an amplifier 110 to a trigger device 112 which fires a silicon control rectifier 114 to energize a relay T when this predetermined voltage level is reached. By way of example, relay T may be energized when the actual deflection reaches approximately ninety percent of the desired nominal deflection. Relay T includes five movable contacts which are shown in their normally de-energized condition as contacts t1 to t5 in FIGURE 3B.

The velocity signals are derived in the same manner as that described above with reference to FIGURE 2. Six of the switch armatures S3–S9 are required to properly route the signals to the proper servos. Considering the illustrated example, line 68y is coupled via armature S3, relay contact r1, deflection pot D1, velocity pot V1, and armature S7 to one side of a resistance 116y from which the output is taken at 118x. Line 68x is identically connected through a path including armatures S5 and S8, and pots D2 and V2 to a resistor 116y from which the output is taken at 118y. Relay contacts t4 and t5 normally short the output resistors 116 to ground, but when relay T is energized contacts t4 and t5 open permitting a voltage to appear across the respective output resistors.

The pick feed control (along the Z axis in the illustrated case) is derived from the armature S10 which is coupled to a pulse generator 120. The pulse generator 120 is fed from a voltage divider 122 coupled by armature 124 to either side of the reference voltage source. By adjusting the voltage divider 122 the extent to which pulse generator 120 steps the associated servo along the pick feed axis may be varied.

To initiate the circuit operation it is necessary that the stylus be moved into contact with the template. This may be accomplished manually in any of the three dimensions by operation of one or more of three switches each of which comprises a pair of ganged armatures 126 and 127 (x, y and z) connected across resistors 128 and 130 on which appears, respectively, reference and out of phase voltages. Thus, movement of armature 126x upwardly applies the in-phase voltage across resistor 128 through armature 126x, normally closed relay contact t1, and resistor 117x to output line 118x. If the switch 127x is thrown downwardly, the out of phase reference across resistor 130 would be applied through armature 127x, relay contact t1, and 117x to the output line 118x in which case the servo would be driven in the opposite direction. In a similar fashion the switches 126y, 127y and 126z, 127z are capable of placing in-phase and out-of-phase control voltages on the respective output lines 118y and 118z.

In operation the user closes one of the switches (for example 126x) applying a voltage to line 118x to drive the servo so that the template approaches the stylus. When contact is made, the stylus begins to deflect and the voltage at the junction of pots D3 and resistor 102 rises until trigger 112 fires the silicon controlled rectifier 114 to energize relay T, thus opening the contacts t1, t2 and t3. When this occurs, manual control of the servos is no longer possible and the servos are responsive only to the error signals from the α and β phase demodulators 44 and 45 which are derived as explained above. Simultaneously, the opening of contacts t4 and t5 permits application of the velocity signals to the respective output lines 118x, 118y or 118z.

FIGURE 3C illustrates the output end of the system and is shown in schematic form since the illustrated components may be well known. Two more contacts of the tracing switch S11 and S12 are necessary to route the signals from the α and β phase demodulators 44 and 45 to the proper servos. Each servo includes a pre-amplifier 132, an amplifier 134 and a motor 136 which may be an electric motor of the type manufactured by Yaskawa Electric Manufacturing Co. Ltd. (Japan) and sold under the mark "Minertia." Thus, with switches S11 and S12 as shown, the output of the α phase demodulator 44 is routed to the pre-amplifier 132x and the output of the β phase demodulator 45 routed to the pre-amplifier 132y. In the preferred embodiment of the invention, wherein electric motors are used, the back E.M.F. developed on the armature of the D.C. motor (as schematically indicated by line 138x) is fed back to the input pre-amplifier 132x to provide a reference for the servo. If desired, a conventional tachometer feedback could also be used.

The motors 136x, 136y, and 136z are D.C. motors with low inertia, high torque properties, and will cause rotation of their output shafts in either direction depending upon the polarity of the voltage applied thereto. The polarity of this voltage is determined primarily by the relative phase of the velocity signals which, it is recalled, are much larger than the position errors. It will be apparent to those skilled in the art that there are numerous ways in which the alternating voltages appearing on lines 118x, 118y and 118z may be used to produce the required bi-polar control signal to suitably position the stylus and template. By way of example, the preamplifiers and/or amplifiers may include a full wave rectifier (not shown), the output of which controls the direct current flow through a conventional silicon controlled rectifier circuit.

It will be apparent to those skilled in the art that the specific pre-amplifiers and amplifiers will vary depending on the particular motors employed. It should also be obvious that the invention would also be applicable to standard hydraulic motors conventionally used for machine tool control.

The three dimensional scanning requires that after each tracing operation, the selected pick feed motor step the stylus along the pick feed axis, and tracing recommence in the reverse direction along the α and β axes. Thus, the limit switches 55 and 57 are arranged so that when the stylus 14 has completed a tracing operation in the α, β plane, one of the two switches will be actuated. There are various ways in which this type of control could be achieved, and in the preferred embodiment the machine operator merely positions the switch actuators so that one of the two switches is actuated at the end of each tracing pass. For purposes of simplicity, only two limit switches are illustrated altough in practice more will normally be employed.

When either of the switches 55, 57 is actuated, a relay R is energized operating contacts r1, r2, r3 and r4 (FIG. 3B). This reverses the phase of the voltages applied to the deflection pots D1 and D2 and from which the velocity control signals on lines 118x, 118y and 118z are derived as explained above. Due to this phase reversal, the motors 136x, y or z, which are in the tracing axes, reverse their direction of rotation causing the stylus to trace backward with respect to the template in the α, β plane. When the stylus subsequently reaches the other limit switch, the template is again stepped along the pick feed axis and the direction of rotation of the motors again reversed so that scanning can continue until the entire template has been covered.

From what has been said previously, it is apparent that the limit switches 55 and 57 must initiate the incremental movement along the pick feed axis. There are obviously numerous ways in which this could be accomplished. For example, when a limit switch is actuated, the output of the pulse generator 120 may be used to (1) brake the two selected tracing motors; (2) operate the pick feed motor after a predetermined interval and (3) brake the pick feed motor and release the two tracer motors after the desired incremental movement. In an obvious fashion, the various delays and the time of operation of the pick feed motor may be controlled whereby the stepping increments are variable over a considerable range.

For all intents and purposes the operation of the circuit is the same regardless of which axes are selected for the tracing axes and which is the pick feed axis. When the switches S1 to S12 are thrown to the "b" position, tracing occurs in the Y, Z plane, i.e. the Y and Z axes become the α and β coordinates, respectively, with the pick feed occurring along the X axis. When the switches S1 to S12 are thrown to the "c" position the X and Z axes are used for tracing with the pick feed occurring along the Y axis.

FIGURES 4 to 7 illustrate a novel and preferred embodiment of the three dimensional tracer head 15 which may be used with the invention. The head includes a cylindrical casing 200 secured to a hat shaped cover member 202 in a suitable fashion. Four radially arranged coil cores 204, 205, 206 and 207 are fixedly mounted within casing 200 to define a cylindrical central area. The cores 204 to 207 rest on annular ledge 208 and are held in place by four screws 210 passing through the ledge 208 and an upper annular core cover 212. Two coils 204a and 204b are wound around 204, with each of coils 205 to 207 including similarly labelled coils, i.e. 205a, 205b, etc. The coil leads are electrically connected to a conventional socket 209, suitably secured at the top of cover 202, which serves as a connector for all of the input and output voltages of the head.

Four adjustment screws 214 cooperate with respective cores 204, 205, 206 and 207 so that the physical positioning of the cores can be adjusted to provide a zero output for zero stylus deflection. Each of the adjustment screws 214 is covered by a button head screw 216 in the casing 200 for protection purposes.

A vertical pendulum 218 is disposed within the central area defined by the cores 204 to 207 and includes a small annular core 220 secured thereto in immediate proximity to the fixed cores 204, 205, 206 and 207. The threaded upper end 221 of pendulum 218 is screwed into a lead weight 222.

A thin circular phosphor bronze diaphram 230 is secured to the bottom of the casing 200 by four screws 232. A short upper holding arm 234 is screwed into the bottom of pendulum 218 immediately beneath diaphragm 230. A second hollow, elongated holder arm 236 is crimped into top holder 234 forming a "knee 238 which in the event of excessive stylus pressure will collapse to avoid damage to the transducer and/or template.

The construction to this point is known. The coils 204a, 204b and 206b (corresponding to the X axis) are connected to form a linear variable differential transformer known as an LVDT. An LVDT produces a fixed frequency voltage, the amplitude of which varies linearly as a function of the position of core 220 with respect to the coil cores 204 and 206. The Y axis coils 205a, 205b and 207a, 207b are identically connected as an LVDT whereby the magnitudes of the output voltages are representative of the stylus deflection along the X and Y axes as discussed above. Arbitrarily, considering a deflection in one direction to produce a voltage at a reference phase, a deflection in the opposite direction will produce an output voltage which is 180° out of phase with the reference, but the amplitude of which is directly proportional to the magnitude of the deflection. Because of the pendulum effect, the voltage output is also dependent upon the stylus length.

According to the present invention, the head further includes transducer means for determining vertical deflection, i.e., deflection along the Z axis. This construction is shown clearly in FIGURES 5 and 7, and includes a coil construction 240 disposed toward the top of the holder arm 236. The leads of the coils 240 of an LVDT are applied to socket 209 through an L-shaped tunnel 241 in pendulum 218. A stylus holder 242 is inserted in the bottom of the elongated holder arm 236 and is adapted to rotate freely within the holder arm by bearing means (not shown) as the stylus contacts the template. The upper end 244 of the stylus holder 242 is threaded both internally and externally. An adjustment screw 246, received internally of the stylus holder portion 244, has an upper threaded end 248 which is received in an internally threaded Z axis core 250, and can be adjusted to locate the LVDT zero.

A coil spring 252 is located between the top of an annular collar 254 and a retaining ring 256.

The function of spring 252 is to bias core 250 into a neutral position within coil 240 by overcoming the force of gravity on the stylus components illustrated, and a spring adjuster 258 is provided to compensate for a difference in spring constants between coil spring 252 and diaphragm 230. Spring adjuster 258 engages the external threads on the upper stylus holder portion 244, and includes a spiral groove 260 which receives one of the coils of the spring 252 such that the spring 252 pushing against the upper end of collar 254 urges the stylus construction (and the core 250) in an upward direction. If the stylus is brought against a surface in the XZ plane at an angle of 45° with the X axis, there should be an equal output from the Z transducer and the Y transducer. However, if the spring constant of the spring 252 in the Z axis transducer mechanism is not indentical with the spring constant of the phosphor bronze diaphragm 230 used for the Y axis deflection, the mechanical deflection resulting from a 45° force would not be precisely equal in the Z and Y directions, but would favor that direction with a lower spring constant. Therefore, it is essential that the Z axis spring constant be adjusted to equal that of the diaphragm. By moving spring adjuster 258 up or down, in effect, the length of the spring 252, and therefore its spring constant, can be caused to match that of the diaphragm 230.

A conventional stylus 262 may be inserted into the bottom of the stylus holder 242 and held there by a set screw inserted through threaded aperture 264. The actual stylus 262 may be conventional and therefore is not shown here in detail. However, when a stylus is inserted in the holder 242, the additional weight of the stylus will necessarily displace the core 250 within coil 240. Hence, it is for this reason that the Z axis null potentiometer illustrated in FIGURE 3B is required.

In the case of the Z axis transducer the coil construction 240 preferably comprises an LVDT. However, the transducer here will only move upwardly from the reference point, and various other coil constructions which will be obvious to those skilled in the art could be employed, as long as the output of the Z axis transducer varies linearly in amplitude as a function of Z axis displacement.

Although preferred embodiments of the various features of the different inventions have been shown and described, the invention is not so limited and many modifications will be obvious to those skilled in the art. The invention is not limited to any specific circuit, nor, of course, to any particular machine tool or the type of motors used

What is claimed is:

1. A tracer head for producing electrical signals representative of the deflection of a stylus from an initial position with respect to three mutually perpendicular axes, comprising a mounting member, means supporting said mounting member for relative movement with respect to two of said axes, said mounting member including means for holding said stylus so as to permit movement of the stylus with respect to said mounting member along the third of said axes, first transducer means for producing electrical signals representative of stylus deflection with respect to said two axes, and second transducer means within said mounting member for producing electrical signals representative of the movement of said stylus with respect to said third axis.

2. A tracer head according to claim 1, wherein said mounting member is movable with said stylus with respect to said two axes, and wherein said first transducer means is responsive to movement of said mounting means with respect to said two axes.

3. A tracer head according to claim 2, including first spring means for returning said mounting member to an initial position, second spring means for returning said stylus to an initial position within said mounting member, and means for adjusting the spring constant of one of said spring means.

4. A tracer head according to claim 3, wherein said spring constant adjusting means cooperates with said second spring means to adjust the spring constant thereof.

5. A tracer head according to claim 4, wherein said second spring means comprises a coil spring and said spring constant adjusting means comprises means for adjusting the effective length of said coil spring.

6. A tracer head according to claim 5, including a stylus holder for holding said stylus, said stylus holder being movable with said stylus with respect to all of said axes, means mounting said stylus holder for movement along said one axis within said mounting means and with respect thereto, said stylus holder including a threaded portion within said mounting means, said coil spring surrounding said threaded portion, and said spring adjuster comprising an annular member threadedly engaging said threaded portion and mechanically engaging a portion of said coil spring.

7. A tracer head according to claim 1, including first spring means for returning said mounting member to an initial position, second spring means for returning said stylus to an initial position within said mounting member, and means for adjusting the spring constant of one of said spring means.

References Cited by the Examiner
UNITED STATES PATENTS 3,094,899 6/1963 Otis _____ 90—62
3,122,970 3/1964 Rhoades _____ 90—62

WILLIAM W. DYER, Jr., *Primary Examiner.*

G. A. DOST, *Assistant Examiner.*